Patented Jan. 3, 1933

1,892,766

UNITED STATES PATENT OFFICE

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE

CATALYTIC REMOVAL OF HYDROGEN OR OXYGEN CONTAINING GROUPS FROM ORGANIC COMPOUNDS

No Drawing.  Application filed April 3, 1928. Serial No. 267,134.

This invention relates to the splitting off of hydrogen or oxygen containing groups from organic compounds. Examples of reactions included under the present invention are dehydrogenations, such as alcohols to aldehydes and ketones, e. g. methyl alcohol to formaldehyde, cyclohexanol and its derivatives to the corresponding cyclohexanones, isopropyl alcohol to acetone, secondary butyl alcohol to methyl ethyl ketone, etc. Dehydrations, e. g. ethyl alcohol to ethylene. Splitting off of carboxyl groups from polycarboxylic acids, e. g. phthalic acid to benzoic acid.

The above typical reactions, which by no means exhaust the subject, show that the splitting reactions of the present invention fall generally into two broad classes, (1) reactions in which only hydrogen is removed and (2) reactions involving the removal of composite groups which contain oxygen. The first class embraces the typical dehydrogenation reactions, which take place by reason of the fact that hydrogen can be split off as such involving only rearrangement of the carbon valences by which it has been attached, but the reactions of the second class require either the removal of hydrogen in addition to the oxygen or the addition of hydrogen to replace the oxygen removed, by reason of the fact that this element can only be split off by removing it in combination with another element such as hydrogen or carbon to form water or an oxide of carbon. Consequently, it is to be understood that the term "splitting groups containing at least one of the elements hydrogen and oxygen", as used in the present specification and claims, necessarily implies that the removal of oxygen must involve the removal of another element in addition thereto and in many cases the taking up of hydrogen to satisfy the valences by which the oxygen was bound.

According to the present invention reactions for splitting off groups containing hydrogen or oxygen are carried out particularly in the vapor phase by means of a new class of contact masses. The contact masses used in the present invention contain base exchange bodies or their derivatives. Under the term "base exchange body" are included all natural or artificial bodies which possess the properties of exchanging their bases for other bases of salt solutions. The base exchanging products used in making catalytic compositions of the present invention or as initial material for derivatives to be so used may possess high base exchanging power or in many cases may possess lower base exchanging power, since the catalytic value of the final compositions is not primarily dependent on the amount of base exchanging power present. In general the base exchange bodies may be divided into two main categories:—two-component and multi-component zeolites, i. e., base exchange bodies containing chemically combined silicon in their nucleus and non-silicious base exchange bodies in which all of the silicon is replaced by other suitable acidic or amphoteric metal oxides. Two-component zeolites are the reaction products of two types of initial components, that is to say, metallates and silicates, (using the term metallate in a somewhat broader sense as will be defined further on in the description), or metal salts and silicates. Frequently more than one member of a type may enter into reaction, that is to say a silicate may react with more than one metallate or more than one metal salt. The multi-component zeolites are the reaction products of at least three types of components, that is to say, at least one silicate, at least one metallate, and at least one metal salt.

The base exchange bodies, both zeolites and non-silicious base exchange bodies, may be associated with diluents preferably in the form of a physically homogeneous structure, as will be described below. Either diluted or undiluted base exchange bodies may be present in the contact masses used in the present invention, or their derivatives may be present, but it should be understood that wherever base exchange bodies are referred to both diluted and undiluted products are included.

Base exchange bodies, both zeolites and non-silicious base exchange bodies, may also be transformed into derivatives which possess many of the chemical and most of the physical characteristics of the parent base exchange bodies. Such derivatives may be salt-like bodies, that is to say, the reaction products of base exchange bodies with compounds containing anions capable of reacting with the base exchange bodies to form products which possess many of the properties of salts. A further class of derivatives are the acid leached base exchange bodies. When a base exchange body is subjected to leaching by acids, particularly dilute mineral acids, the exchangeable bases are first gradually removed. The resulting products contain both the more basic and more acidic components of the non-exchangeable nucleus of the base exchange body, with or without a portion of the exchangeable bases. As the leaching is carried on further, more and more of the relatively positive components of the non-exchangeable nucleus are removed, and if carried to completion the leached product contains only the relatively acid components of the non-exchangeable nucleus. In the case of zeolites the final product from long continued leaching is a complex silicic acid which has many of the physical properties of the original base exchange body. In the description and claims the class of base exchange bodies and their derivatives will be referred to by the generic term "permutogenetic" products.

Catalytically active components may be associated with diluted or undiluted permutogenetic bodies in four main forms, as follows:—(1) They may be physically admixed with or impregnated into the permutogenetic products. (2) They may be physically, homogeneously incorporated into the permutogenetic products before the latter have been completely formed in the form of catalytically active diluent bodies or in the form of diluents which have been impregnated with catalytically active substances. (3) They may be chemically combined with or in the permutogenetic products in non-exchangeable form, that is to say, they may form a part of the non-exchangeable nucleus of the base exchange body present in the final contact mass or which is transformed into the derivatives, or they may be chemically combined with the base exchange bodies in the form of catalytically active anions which form with the base exchange body salt-like bodies. (4) They may be chemically combined in exchangeable form either during the formation of the base exchange body or by base exchange after formation. Obviously of course the same or different catalytically active component may be present in more than one of the above described forms, and it is an advantage of the present invention that catalytically active substances may be introduced in a wide variety of forms which gives a large field of choice to the catalytic chemist.

While the different permutogenetic products may vary widely in their chemical characteristics, they all possess a similar physical structure which is characterized by more or less high porosity, frequently microporosity, and great resistance to high temperatures, and in the case of products which have not been acid leached to the point of removal of catalytically active components these components are distributed throughout the framework of the products in atomic or molecular dispersion, as will be described in greater detail below, and this chemical homogeneity is one of the important advantages of some of the contact masses of the present invention.

While three of the methods of combination of the catalytically active substances may be effected with undiluted as well as diluted permutogenetic products, it has been found that for most reactions homogeneously diluted permutogenetic contact masses are of advantage, particularly where the diluents are of a physical nature such as to exert a desired influence on a catalytic activity of the contact masses, as when, for example, diluents are rich in silica, which has been found to have an activating power, or where the diluents by reason of high porosity, capillarity, or surface energy may be considered as physical catalysts or activators.

Base exchange bodies used in contact masses of the present invention behave as if they were products of extremely high molecular weight for catalytically active components can be introduced either into the non-exchangeable nucleus or in the form of exchangeable bases in practically any desirable proportions and the ordinary law of chemical combining proportions, which in compounds of low molecular weight restricts the proportions in which components can be incorporated chemically, appears to be without force, which makes it reasonable to assume that the molecular weight is so high as to completely mask the effect of the law. It is of course possible that the base exchange bodies, or some of them, may be solid solutions of a plurality of related compounds of lower molecular weight. It has not been possible hitherto to definitely settle this question, as base exchange bodies are not readily capable of structural chemical analysis. The present invention is of course not limited to any theory, but irrespective of the underlying reasons the fact that catalytically active components may be chemically introduced in any desired proportions is of enormous importance to the catalytic chemist and gives him the power to produce an almost unlimited number of finely and gradually toned catalysts or contact masses for the splitting off of hydrogen or oxygen containing groups from organic compounds and in all cases the contact masses produced are highly effective by reason of the desirable physical structure of the permutogenetic products contained therein and the wide limits of homogeneous dilution of catalytically active molecules or atoms with resulting uniformity and smoothness of action, which is of great importance, particularly in the sensitive reactions for which contact masses used in the present invention are peculiarly adapted.

In addition to the important characteristics with which permutogenetic products endow the contact masses of the present invention, it has been found that for many of the reactions coming within the scope of the present invention it is desirable to stabilize the contact masses, and this may be effected by associating with the permutogenetic products or incorporating or forming therein compounds of the alkali forming metals, that is to say, the alkali metals, the alkaline earth metals, and the strongly basic earth metals. These compounds appear to slow up or smooth out the catalytic reaction, and will be referred to throughout this specification as stabilizers. The stabilizers may be non-alkaline, weakly alkaline or strongly alkaline, depending on the reaction products and on the nature of the catalytically active components used. It is a great advantage of the present invention that in the normal formation of base exchange bodies alkali forming metal oxides are present as exchangeable bases, and whether used without acid treatment or treated with acid, they form stabilizers which are combined in or associated with the resulting permutogenetic products in an extremely fine state of division in which the stabilizers are peculiarly active. Thus, base exchange bodies containing alkali forming metal exchangeable bases may be considered as complex stabilizers.

In addition to the use of stabilizers, which are important in a large number of splitting reactions included in the scope of the present invention, it has been found that the stabilizer action and the overall efficiency of the contact masses can in many cases be greatly increased or enhanced by the association therewith or chemical combination therein of elements or radicals or groups which are catalytically active but do not possess specific catalytic activity for the particular reaction to be carried out. Many reactions are aided by the presence of catalysts favoring other types of reactions, such as oxidations, reductions, and the like which are not specific splitting catalysts. Such catalysts or catalytic components which are not specific catalysts for the reaction in which they are being used under the reaction conditions obtaining will be referred to throughout the specification as stabilizer promoters, as they appear to enhance the toning effect which can be achieved by stabilizers. The use of this expression should, however, in no sense be taken to limit the expression to a particular theory of action of these non-specific catalysts and in fact in some cases stabilizer promoters may be present where there are no stabilizers.

The tremendous range of chemical groups which may be combined in or with or incorporated in permutogenetic products permits a wide choice of stabilizer promoters as well as specific catalysts, and permits their association with the contact masses in an extremely homogeneous and catalytically efficient form. Thus, many base exchange bodies or their derivatives may be considered as complex catalysts, stabilizers and stabilizer promoters, as all of these elements may be present in the same chemical compound and sharing the advantages flowing from its desirable physical structure and chemical properties. Of course both stabilizer and stabilizer promoters may be mixed partly or wholly with permutogenetic products and a single stabilizer or single stabilizer promoter may be present partly in physical admixture and partly in chemical combination, as will be clear to the skilled base exchange chemist.

The base exchange bodies which form the important components or initial material for derivatives in contact masses of the present invention may be prepared by any of the well known methods. Thus, for example, two-component zeolites may be prepared by wet methods in which the metallate components or metal salt components, part or all of which may be catalytically active, are caused to react with soluble silicates to form zeolites of alumino silicate or aluminum double silicate types, or the components may be fused, preferably in the presence of fluxes. It should be understood that under the term metallate is included not only the alkaline solutions of amphoteric metal oxides or hydroxides but also alkali forming metal salts of metal acids, such as the oxyacids of metals of the fifth and sixth groups, which in at least one stage of oxidation are not strictly speaking amphoteric, but which products are capable of reacting with silicates to form zeolites, or with other components to form non-silicious base exchange bodies. Throughout the specification this somewhat more general definition of metallates will be strictly adhered to. In the formation of two-component zeolites by wet methods, the final reaction product must be alkaline to litmus, and for products of high base exchanging power it should be neutral or alkaline to phenolphthalein. For the purpose of producing base exchange bodies to be used in the preparation of contact masses of the present invention it is sometimes unnecessary to provide high base exchanging power, and for many purposes zeolites formed under conditions resulting in a final reaction which is acid to phenolphthalein but alkaline to litmus are of advantage. It is not definitely known whether products produced under such circumstances are homogeneous chemical compounds, although in many ways they behave as such. There is, however, reason to believe that in some cases at least mixtures of base exchanging and non-base exchanging polysilicates may be produced. For the purpose of the present specification a product will be considered as a base exchange product if it has any base exchange power at all.

It is desirable for many purposes, and particularly where two-component zeolites of high base exchanging power are needed, to add the relatively acid components, for example, metal salts in the case of aluminum double silicate type of silicates, to the relatively more alkaline components such as, for example, soluble silicates. By these means a continuous alkalinity is insured, and this method may be considered as the preferred method in most cases, but the opposite procedure is advantageous for certain contact masses and is included in the invention.

Multi-component zeolites may be prepared by any of the foregoing methods using at least three types of components, that is to say, at least one metallate, at least one metal salt and at least one soluble silicate. In the case of multi-component zeolites, as in the case of two-component zeolites, the conditions of alkalinity should be observed, and for many purposes it is advantageous to add the relatively acid components to the relatively alkaline components in order to insure continuous alkaline reaction. The multi-component zeolites produced vary in their nature, depending on the proportion of the different reacting components. Thus, where the metallates and silicates predominate over the metal salts the resulting products resemble the alumino silicate type of two-component zeolites; if the metal salts and silicates predominate over the metallates the products resemble the aluminum double silicate type of two-component zeolites; and, finally, if the metallates and metal salts predominate over the silicates the resulting product resembles more or less non-silicious base exchange bodies. It will be clear that there is no sharp defining line between the three types of multi-component zeolites, and one shades into the other as the proportions of the different components vary. It is an advantage of the multi-component zeolites over the two-component zeolites that the choice of catalytically active components is wider, as some catalytically active elements or groups can only be incorporated in the form of metallates and others only in the form of metal salts. In the multi-component zeolites each catalytically active group can be incorporated in the form in which it is best available.

Non-silicious base exchange bodies are produced by the general methods described above, but instead of bringing about reactions between silicates and other metal oxide components, two or more oxymetal compounds are caused to react; in general, at least one will be a metallate and at least one a metal salt, or in some cases it is possible to bring about action between two different metallates in which one negative radical is more acidic than the other. It is possible to produce non-silicious base exchange bodies in which a plurality of metal oxides is present. It is also possible to produce non-silicious base exchange bodies in which a single metal is present. Thus, for example, some metals may be sufficiently amphoteric in character to form both metallates and metal salts which are capable of reacting with each other to produce base exchange bodies.

A special method of producing non-silicious base exchange bodies consists in the gradual neutralization of strongly alkaline salts of the oxyacids of metal elements of the fifth and sixth groups in stages of oxidation in which they are sufficiently amphoteric. The neutralization of other strongly alkaline metallates may also bring about formation of non-silicious base exchange bodies. The converse method, whereby non-alkaline salts of suitable metals are gradually treated with alkali until the reaction is sufficiently alkaline to permit the formation of base exchange bodies, may also be used.

Many metals are capable of entering into the base exchange formation only in certain stages of oxidation, and it is sometimes necessary to introduce such metals in a stage of oxidation different from that desired in the final base exchange body, the change of stage of oxidation being preferably effected during the formation of the base exchange body. Certain other elements may be incorporated in the form of complex compounds of the most various types, such as, for example, ammonia complexes and the like.

In addition to the artificial base exchange bodies briefly described above, natural base exchange bodies, such as nepheline, leucite, felspar, and the like, may be used.

The most important contact masses for many reactions contain permutogenetic products in which preferably the diluents are homogeneously incorporated into the base exchange bodies before formation of the latter, or at least before the base exchange body has set after formation. Many diluents, such as inert, stabilizing, activating, catalytically active, or having stabilizer promoter effects, can be used. A few of the diluents will be briefly enumerated:—kieselguhrs of all kinds, particularly natural or treated "Celite" earth; silicious powders of various types; powdered permutogenetic products; natural or artificial powders of rocks, stones, tuffs, trass, lava, and similarly volcanic products which are frequently highly porous; greensand; glauconite or its acid leached derivative glaucosil; pulverized slag wool; cements; sand; silica gel; pulverized earthenware; fuller's earth; talc; glass powder; pumice meal; asbestos; graphite; activated carbon; quartz meal; various pulverized minerals rich in quartz; metal powders and metal alloy powders; salts of oxymetal acids such as tungstates, vanadates, chromates, uranates, manganates, cerates, molybdates, etc., and particularly copper salts of the above; silicates, such as copper silicate, iron silicate, nickel silicate, cobalt silicate, aluminum silicate, titanium silicate; minerals or ores, especially those rich in copper, etc. Finely divided diluents are of great advantage, especially when the average particle size is less than 60 microns, in which case the diluents possess high surface energy which increases the adsorptive and absorptive capacity of the contact mass, the diffusion speed and porosity. These finely divided diluents may be considered as physical catalysts or activators. Diluted permutogenetic bodies may also be finely divided and used as part or all of the diluents of other base exchange bodies.

The following nine methods are the most effective for the introduction of diluents, but any other suitable methods can be used.

(1) The diluents may be mixed with one or more liquid components of the base exchange bodies to be formed when the latter are prepared by wet methods.

(2) Components, either catalytically active, stabilizer promoters, or others, may be precipitated or impregnated into diluent bodies which are then incorporated into the base exchange bodies by any suitable methods of incorporation.

(3) Diluents may be mixed with base exchange bodies when the latter are still in the form of gels by kneading or stirring, in which case the base exchange gel behaves as an adhesive. The homogeneity and uniformity of the distribution of the diluents is of course not quite so great by this method as by method (1), but for the splitting of hydrogen or oxygen containing groups from organic compounds extreme uniformity is not essential.

(4) Diluents may be formed during the formation of the base exchange bodies by mixing suitable compounds with the components of the base exchange bodies so that the diluent particles are precipitated during formation. Protective colloids may be added to prevent coagulation of the diluent particles before the base exchange bodies have become sufficiently set.

(5) Compounds may be added which react with certain of the base exchange bodies forming components to produce diluents, for instance salts of the metal acids of the fifth and sixth groups may be added in sufficient excess so that they react with components of the base exchange body to form in soluble diluents, as, for example, with heavy metal oxides.

(6) Preformed base exchange bodies, diluted or undiluted, artificial or natural, can be impregnated with true or collodial solutions of catalytically effective components and then dried.

(7) A preformed base exchange body, diluted or undiluted, may be impregnated with a plurality of solutions which react therein to precipitate any desired diluents.

(8) Soluble diluent compounds may be added to the components forming a base exchange body, which, after formation, retains the compounds in solution and is dried without washing, or is treated to precipitate the compounds.

(9) Natural base exchange bodies or artificial base exchange bodies, diluted or undiluted, or their derivatives, may be impregnated with solutions of the desired compounds, which are then precipitated by means of reactive gases.

The nucleus or non-exchangeable portion of the molecules of the base exchange bodies is ordinarily considered to consist of two types of oxides, namely, relatively basic metal oxides, usually amphoteric, and relatively acidic oxides, such as $SiO_2$, some amphoteric metal oxides and some metal oxides which have a distinctly acid character. The nucleus behaves as a single anion and cannot be split by ordinary chemical means, but it is advantageous to consider the two portions of the nucleus as the basic and acidic portions, bearing in mind of course that the nucleus behaves as a single group. The metal compounds which are capable of forming the basic portion of the nucleus are those of the following metals: copper, silver, gold, bismuth, beryllium, zinc, cadmium, boron, aluminum, some rare earths, titanium, zirconium, tin, lead, thorium, niobium, antimony, tantalum, chromium, molybdenum, trungsten, uranium, vanadium, manganese, iron, nickel, cobalt, platinum, palladium. Compounds of these elements may be introduced singly or in mixtures, in any desired proportions, and may be in the form of simple or complex ions. It should be understood that some of the elements in certain stages of oxidation may be introduced either as metallates or metal salts; others may be introduced in only one form; and still others may be introduced in a stage of oxidation other than that desired in the final base exchange body, or in the form of complex compounds. Among the complex ionogens are ammonia, hydrocyanic acid, oxalic acid, formic acid, tartaric acid, citric acid, glycerine, and the like.

Many of the metals are specific catalysts, others are stabilizers, and still others are stabilizer promoters. Naturally the status of an element as catalyst or stabilizer promoter will vary with the particular reaction for which the final contact mass is to be used, and the choice of catalysts and stabilizer promoters together, with the proportions, will be determined by the particular organic splitting reaction for which the contact mass is to be used.

Examples of components forming the relatively acid portion of the base exchange nucleus are alkali metal silicates which are soluble in alkali, and alkali metal salts of acids, such as those of boron, phosphorus, nitrogen, tin, titanium, vanadium, tungsten, chromium, niobium, tantalum, uranium, antimony, manganese, etc.

The exchangeable bases of the base exchange bodies may be substituted by base exchange, and the elements which can be introduced singly or in admixture by base exchange are the following:—copper, silver, gold, ammonium, beryllium, calcium, manganese, caesium, potassium, sodium, zinc, strontium, cadmium, barium, lead, aluminum, scandium, titanium, zirconium, tin, antimony, thorium, vanadium, lithium, rubidium, thallium, bismuth, chromium, uranium, manganese, iron, cobalt, nickel, ruthenium, palladium, platinum and cerium.

Depending on the reactions in which the contact mass is to be used, the exchangeable bases introduced may be specific catalysts, they may be stabilizers, or they may be stabilizer promoters. They may be introduced as simple ions or as complex ions, and may enhance the catalytic activity of the final contact mass, improve its physical strength, or both.

As has been described above, base exchange bodies can be caused to react with compounds containing acidic radicals capable of forming therewith salt-like bodies. The radicals may be present in the form of simple acid radicals, polyacid radicals or complex acid radicals, and include radicals containing the following elements:—chromium, vanadium, tungsten, uranium, molybdenum, manganese, tantalum, niobium, antimony, selenium, tellurium, phosphorus, bismuth, tin, chlorine, platinum, boron. Among the complex radicals are ferro- and ferri-cyanogen, certain ammonia complexes and the like. The amount of acid radicals caused to unite with the base exchange bodies to form salt-like bodies may be varied so that the resulting products may possess the character of acid, neutral or basic salts. Many of these acid radicals are stabilizers or stabilizer promoters for the splitting off of hydrogen or oxygen containing groups from organic compounds.

The base exchange bodies, diluted or undiluted or some of their salt-like body derivatives, may be treated with acids, such as mineral acids, for example, 2–10% sulfuric, hydrochloric or nitric acids, to remove part or all of the exchangeable bases, or also part or all of the basic portion of the nucleus.

In the case of zeolites, the partial leaching with acids, which leaves part or all of the basic portion of the nucleus or even part of the exchangeable bases, does not affect the function of the zeolites as catalysts when they contain catalytically active elements in the basic portion of the nucleus, or in some cases even exchangeable bases, and such partially leached catalysts are of great importance in many reactions. Where the leaching is carried out to completion the advantageous physical structure remains to a considerable extent the same but the remainder is of course a form of silica, or, in the case of zeolites in which part of the silica is replaced by other acidic compounds, a mixture of the two and usually will not be a specific catalyst for the reactions of the present invention. It serves, however, as an advantageous physical carrier of specific catalysts, and in the case of partially substituted zeolites may also contain stabilizer promoters.

Leached non-silicious base exchange bodies, either partially or completely leached, may contain catalytically active components and behave as catalysts, stabilizer promoters or both, and many important catalysts are thus obtained. This is particularly the case for reactions where a relatively alkali-free contact mass is required for best results and where the alkali content of a contact mass containing a base exchange body may be too great for optimum results.

Base exchange bodies or their derivatives, diluted or undiluted, may also be coated in the form of films on massive carrier granules or may be impregnated therein. The massive carriers may be inert, activating, or themselves catalysts. For example, certain catalytic metal alloys, and minerals fall within this class. Aluminum or copper alloy granules perform an additional advantageous function in that their relatively high heat conductivity tends to prevent local overheating in exothermic reactions, which is of considerable importance in obtaining good yields as many of the reactions, are equilibrium reactions, and at higher temperatures the equilibrium may be adversely affected with resulting lowering of yields and contamination of the product.

*Example 1*

22 parts of basic copper carbonate are dissolved in the form of a cuprammonium compound by means of 10% ammonia water. 10.2 parts of freshly precipitated aluminum hydroxide are dissolved up in sufficient 2 N sodium hydroxide solution to form a clear sodium aluminate solution, and, finally, 24 parts of copper nitrate containing 3 mols of water are dissolved in 100 parts of water. The cuprammonium carbonate and the sodium aluminate solutions are then mixed together and 50 parts of kieselguhr are introduced with vigorous agitation. Sufficient copper nitrate solution is then poured into the mixture with vigorous stirring until a gelatinous blue product separates out, the reaction being neutral or slightly alkaline to phenolphthalein. The product is a non-silicious base exchange body containing sodium, copper and aluminum, and is diluted with materials rich in $SiO_2$.

The gel is pressed and dried, preferably at temperatures not exceeding 100° C., broken into fragments and hydrated with water. The contact mass is then ready for use, but it is advantageous in some cases to leach the hydrated base exchange body before drying for a short time in order to remove part of the exchangeable alkali. The leaching may be effected by trickling 1 to 2% nitric acid over the mass. After leaching the product is again dried and constitutes a well toned contact mass for dehydrogenations. Before use the contact mass may advantageously be given a preliminary treatment with hydrogen containing gases at 300° C.

Alcohol vapors are passed over the contact mass, the corresponding aldehydes or ketones being produced. Thus, for example, ethyl alcohol vapors may be passed over the contact mass at temperatures between 200 and 300° C., and are readily dehydrogenated to acetaldehyde. Similarly, cyclohexanol can be dehydrogenated to cyclohexanone at 220–300° C., while isopropyl alcohol or secondary butyl alcohol can be transformed into acetone or methylethylketone respectively at 300–400° C. The same contact mass can be used for the dehydrogenation of benzyl alcohol, producing benzaldehyde as the main product.

The same contact mass can be used for the splitting off of amino groups, thus for example when aniline vapors are passed over the contact mass under the reaction conditions set forth they are transformed into diphenylamine.

*Example 2*

The following three solutions are prepared:

1. 2.5 parts of aluminum oxide in the form of the hydroxide freshly precipitated from an aluminum salt solution are dissolved in a 2 N sodium hydroxide solution to form the corresponding sodium aluminate.

2. 60 parts of zinc nitrate with 6 mols of water are dissolved in 200 parts of water and sufficient 10 N sodium hydroxide solution are added to form the corresponding sodium zincate.

3. A 10% solution is prepared containing chromium nitrate with 9 mols of water, copper nitrate with 6 mols of water and ferric nitrate with 9 mols of water dissolved in a proportion which will give 1 part of $Cr_2O_3$ to 4 parts of CuO to 1.5 parts of $Fe_2O_3$.

Solutions 1 and 2 are poured together and 50 parts of monazite sand refuse are added. Thereupon solution #3 is poured in with vigorous agitation until the reaction mixture remains slightly alkaline to phenolphthalein. The precipitate obtained is sucked, pressed, and dried at temperatures up to 150° C. The cake formed is then broken up and constitutes a diluted base exchange body containing alkali, aluminum, zinc, chromium, copper and iron. The product is then hydrated with water in the usual manner by trickling cold or warm water over the fragments and is again dried when it constitutes an effective contact mass for the splitting off of oxygen containing groups from organic compounds, such as, for example, carboxyl groups from polycarboxylic acids.

The vapors of the polycarboxylic acids or their anhydrides admixed with steam are passed over the contact mass at 360–450° C., the corresponding monocarboxylic acids being produced. Thus, for example, phthalic anhydride vapors mixed with steam may be passed over the contact mass at 380–420° C. and are transformed into benzoic acid with a good yield. 1 part of phthalic anhydride to 10 parts of water in the form of steam is a favorable ratio. The benzoic acid obtained contains smaller or larger amounts of phthalic acid depending on the loading of the contact mass. When the contact mass is loaded with 2–4 parts by weight of phthalic anhydride and 50 parts of water per 160 volumes of contact mass per hour, a mixture of phthalic acid and benzoic acid are obtained at 400–420° C. The mixture in many cases contains about 90% benzoic acid. The separation of the benzoic acid from unchanged phthalic acid may be carried out in several ways, for example, by extraction with organic solvents, such as benzol, ether, chloroform, etc. especially in a continuous or partly continuous process, the phthalic acid remaining because it is relatively insoluble. A good separation may also be obtained by subjecting the mixture to the action of steam at temperatures below 191° C. but above the vaporizing temperature of the benzoic acid in the concentration obtained. The phthalic anhydride vapors are transformed into phthalic acid which is non-volatile, whereas the benzoic acid remains in the form of a vapor from which it can be readily condensed. Vapors of organic solvents may also be used in place of steam and can be employed for the separation of the benzoic and phthalic acid, even after they have been condensed in the form of a mixture, the organic solvent vapors being caused to contact with the mixture which may or may not be in solution at a temperature below 191° C. but sufficiently high to result in effective sublimation of the benzoic acid.

A continuous extraction by means of an organic solvent is described and claimed in my prior Patent No. 1,685,634 dated September 25, 1928, the steam method of separation is described and claimed in my prior Patent No. 1,686,913 dated October 9, 1928, and the use of vapors of organic solvents is described and claimed in my prior Patent No. 1,694,124 dated December 4, 1928.

Instead of treating phthalic anhydride, other polycarboxylic acids or their anhydrides may be transformed into monocarboxylic acids. Thus, for example, substituted phthalic anhydrides, such as halogen and nitro derivatives, for example monohalogen, dihalogen, or tetrahalogen phthalic acids may be used. Naphthalic anhydride, diphenic acid and their derivatives, maleic acid, adipic acid, succinic acid, mesotartaric acid, pyrotartaric acid, gultaric acid, and the like may be effectively decarboxylated to the corresponding monocarboxylic acids. Instead of using the free acids or their anhydrides esters may be used; thus, for example, dimethyl phthalate may be treated, resulting mainly in the production of benzoic acid together with some benzaldehyde. In many cases, other gases may be present, such as nitrogen, and the amount may be sufficient so that the reaction product is obtained in a more or less solid form since the relatively inert gases tend to carry off a good deal of the excess steam. These gases may be recirculated after cooling down in order to separate out water and carbon dioxide, if necessary using pressure in order to improve the separation.

Air may also be mixed with steam but in such cases where the vapors of a dicarboxylic acid, such as phthalic anhydride, are being treated a larger excess of steam should preferably be used than when the reaction is carried out in the presence of an inert gas such as nitrogen for otherwise there is a tendency to lose some of the phthalic anhydride by oxidation.

The contact masses described above may also be given preliminary treatment with reducing gases such as hydrogen, water gas, cracking still tail gases, illuminating gas, and the like at temperatures from 200—400° C.

Other effective contact masses may be obtained by using other metal oxides in the formation of the base exchange body, thus, for example, cerium oxide, chromium oxide, tin oxide, cadmium oxide, tantalum dioxide, manganous oxide, thorium oxide, beryllium oxide, boron trioxide, vanadium tri-tetra-and pentoxide, tungsten trioxide, cobalt oxide, lead oxide, and the like may be used singly or in mixtures.

Instead of producing permutogenetic bodies by wet methods, fusion methods may be used. Products of high base exchange power are obtained when borax is used as a flux and if desired base exchange bodies containing silicon may be produced by adding alkali metal silicates to the fusion.

Modified contact masses can be obtained by exchanging all or part of the alkali for other metals, thus, for example, the base exchange body may be treated with solutions containing one or more of the following: manganous sulfate, nickel sulfate, copper sulfate, cobalt sulfate, silver nitrate, ferric nitrate, and the like. After base exchange has been effected it is advantageous to carefully wash out the excess salt solution and to dry at temperatures which gradually rise to about 150° C. The contact masses may also advantageously be reduced at 300–400° C. with reducing gases such as those containing hydrogen or carbon monoxide.

A further modification consists in the formation of salt-like bodies of the permutogenetic bodies with metal acids of the fifth and sixth groups of the periodic system. Thus, for example, the base exchange bodies may be treated with a 1% ammonium vanadate or tungstate solution which can advantageously be trickled over the base exchange body, especially after heavy metal oxides have been introduced by base exchange. These contact masses are also preferably reduced before used. When phthalic anhydride vapors mixed with steam in the ratio of 1:10 to 1:20 are passed over the contact mass high yields of benzoic acid are obtained, only small amounts of phthalic anhydride remaining unchanged.

Another class of contact masses is obtained by leaching the base exchange bodies with dilute acid, such as hydrochloric and nitric acid of ½ to 3% concentration. The dilute acid is trickled over the hydrated base exchange bodies resulting in the production of leached permutogenetic bodies in which more or less of the exchangeable alkali has been removed. By this procedure very effective contact masses are obtained. The leaching may also be applied to base exchange bodies in which some heavy metal oxides have been introduced by base exchange. The action, of course, first removes the remaining alkali. Salt-like bodies may also be treated in the same manner.

The contact masses described above are not limited in their use to the vapor phase splitting of carboxyl groups and on the contrary can also be used in the liquid phase. Dissolved or suspended phthalic acid or derivatives of phthalic acid or their acid or neutral salts, especially alkali metal salts, are heated up under pressure to temperatures between 250–300° C., the water present having 3–5% of the contact masses suspended in it. Corresponding benzoic acids are obtained with high yields and possess an excellent quality. Other polycarboxylic acids may be similarly treated.

The contact masses described above are also well suited for splitting off of carboxyl groups from polycarboxylic acids, especially dicarboxylic acids in the presence of reducing gases such as hydrogen with or without steam. Thus, for example, phthalic anhydride vapors or molten phthalic anhydride may be treated with reducing gases. One method consists in vaporizing phthalic anhydride in a stream of hydrogen in a ratio of 1 part by weight of phthalic anhydride to 5–15 corresponding parts by volume of hydrogen, the mixture being passed over the contact mass at 340–400° C. Benzoic acid of excellent purity is obtained. When higher temperatures are used, for example 390–420° C., the benzoic acid contains small amounts of benzaldehyde as an impurity. Larger amounts of compounds in which the second carboxyl group is reduced are obtained when the contact mass contains large amounts of ferric oxide, cobalt oxide, manganous oxide or stannic oxide. In such cases the second carboxyl group of a dicarboxylic acid is reduced to the aldehyde and in this manner good yields of benzaldehyde may be obtained from a phthalic anhydride hydrogen mixture. The benzaldehyde may also contain small amounts of benzyl alcohol.

The contact masses above described are also effective for combined catalysis in which the splitting off of a carboxyl group is combined with other reactions. Thus, for example, dimethyl phthalate or phthalic anhydride and methyl alcohol when passed over the contact mass in the presence or absence of reducing gases such as hydrogen with or without steam may be transformed into benzoic acid, benzaldehyde, benzyl alcohol, methyl benzoate and benzyl benzoate. For example, if dimethyl phthalate admixed with hydrogen is passed over the contact mass at 360–400° C. benzyl benzoate is obtained as the main product. A small excess of hydrogen over that theoretically required appears to be favorable. A similar synthesis can be effected in the liquid phase with hydrogen under a pressure of 10–15 atmospheres at a temperature of 250–300° C., the catalyst being suspended in the dimethyl phthalate.

Another class of reaction consists in the production of nitrogen-containing compounds from polycarboxylic acids such as phthalic anhydride. Thus, for example, if phthalic anhydride, ammonia and hydrogen are passed over the contact mass under the reaction conditions described above a product is obtained which contains benzamide. Aliphatic and aromatic amines such as aniline may, of course, be substituted for the ammonia, producing the corresponding amino compounds.

Example 3

An artificial zeolite is prepared by fusion methods, calcined soda, alumina and finely powdered sand are fused and catalytically effective radicals are then introduced by base exchange, for example by trickling normal solutions of metal salts such as silver sulphate, stannous chloride, manganese nitrate, nickel nitrate, cobalt nitrate, cerium nitrate or ferric chloride, or a mixture of two or more of them, over the zeolite.

Catalytically effective components may also be introduced into the non-exchangeable nucleus of the base exchange body in the fusion. Thus for example, boron trioxide, vanadium tri- or tetroxide, chromium oxide, manganese oxide, iron oxide, cobalt sesquioxide, zinc oxide, cadmium oxide, zirconium oxide, tin oxide, copper oxide, beryllium oxide, lead oxide, cerium oxide, or mixtures, may form part of the components of the melt. For example, a mixture of 1 mol sodium carbonate, 1 mol manganous oxide, 4 mols silicon dioxide and 6 mols of sodium silicate, are fused. The product, after hydrolysis with warm water, is in the form of dark violet scaly crystals. After base exchange with a normal copper nitrate solution a contact mass is obtained which is very effective for the splitting off of one carboxyl group from phthalic acid in the vapor or in the liquid phase. Thus 100 parts of phthalic anhydride suspended in 350 parts of water, together with 2 to 5 parts of the contact mass, are thoroughly mixed and heated in an autoclave at 250–280° C. for a period of ten to twelve hours. The phthalic acid is transformed into benzoic acid, giving high yields. When the splitting reaction is carried out in the liquid phase in the presence of reducing gases such as hydrogen it appears to be accelerated, and in addition to benzoic acid larger or smaller amounts of benzaldehyde or benzyl alcohol or a mixture are obtained, depending on the amount of hydrogen used.

Similar fusion contact masses can be obtained by fusing 1 mol of sodium carbonate, 1 mol of ferric oxide, 4 mols $SiO_2$ and 6 mols of sodium silicate. Some other mixtures are as follows:—1 mol sodium carbonate, ½ mol boron trioxide, ½ mol ferric oxide, 4 mols $SiO_2$ and 6 mols sodium silicate; 1 mol sodium carbonate, 0.2 mols chromium oxide, 0.8 mols ferric oxide and 6 mols sodium silicate; 1 mol sodium carbonate, ½ mol aluminum oxide, ½ mol ferric oxide, 4 mols $SiO_2$ and 6 mols potassium silicate; 1 mol potassium carbonate, 0.2 mols manganous oxide, 0.8 mols of ferric oxide and 6 mols of sodium silicate; 1 mol sodium carbonate, 1 mol cobalt oxide, 4 mols $SiO_2$, 6 mols sodium silicate; 1 mol sodium carbonate, ½ mol ferric oxide, ½ mol cobalt oxide, 4 mols $SiO_2$ and 6 mols sodium silicate.

Contact masses containing the elements iron, cobalt, nickel and manganese are very effective for the transformation of phthalic anhydride in the vapor phase by means of gases such as hydrogen, with or without the presence of steam, directly into benzaldehyde at the temperatures given above.

When borax is used as a flux instead of waterglass highly effective contact masses are obtained. Thus, for example, a mixture of 5 mols sodium carbonate, 1 mol ferric oxide, 2 mols titanium dioxide and 1 mol borax may be fused together, followed by treatment with water to hydrate and remove the excess alkali present during the fusion. The contact masses may also be further modified by exchanging the exchangeable alkali for other metal oxides, especially those of the heavy metals, earth metals or rare earth metals, singly or in admixture.

A further class of contact masses especially effective for the splitting off of the carboxyl group from polycarboxylic acids is obtained by forming the so called salt like bodies which are the reaction products of the base exchange bodies with acids or salt solutions, especially those of the metal acids of the 5th and 6th group of the periodic system. The products may be obtained, for example, by trickling dilute solutions over the base exchange body after the exchangeable alkali has been replaced by copper. A 1% solution of ammonium vanadate or ammonium tungstate, or a mixture, may be used. Instead of trickling the solution over the base exchange body the latter may be suspended in the salt solution.

Other effective contact masses may be obtained by removing part of the alkali of the base exchange body by careful treatment with dilute acids such as 1% nitric or hydrochloric acid. By this method the alkali can be partly or entirely leached out, depending on the length of the treatment. This treatment can also be applied to base exchange bodies in which part of the alkali has been replaced by other metal salts. Salt like bodies can also be so treated. In either case contact mass compositions are obtained which possess a very favorable physical structure.

Phthalic anhydride mixed with hydrogen, which latter should preferably be 500 to 1,000% in excess of the theoretical amount, is passed over the contact mass compositions, especially leached contact masses, at a temperature of 340–380° C. Benzoic acid results with excellent yields, especially if copper and zinc are the main components of the base exchange bodies. If iron, cobalt or manganese are the main components high yields of benzaldehyde are obtained.

Dimethyl phthalate mixed with hydrogen can be passed over the contact mass at 360–400° C., and a product is obtained consisting mainly of benzyl benzoate, but also containing methyl benzoate together with small amounts of benzyl alcohol and benzoic acid. If phthalic anhydride mixed with methyl alcohol and hydrogen is passed over the contact mass, or if dimethyl phthalate is used without hydrogen, similar reactions are obtained. The same reactions may be carried out in the presence of steam, in which case benzoic acid and benzaldehyde are the main products.

*Example 4*

(1) 26 parts of $SiO_2$ in the form of a commercial waterglass solution are diluted with 4–5 volumes of water.

(2) A sodium beryllate solution is prepared from 4.5 parts of freshly precipitated beryllium hydroxide dissolved up in a 2 to 5 N sodium hydroxide solution.

(3) About 14 parts of ferric chloride are dissolved in 250 parts of water. The waterglass and beryllate solutions are poured together and sufficient ferric chloride solution is added in a thin stream with vigorous agitation so that the resulting gelatinous precipitate remains slightly alkaline or neutral to phenolphthalein. The gel formed is separated, carefully washed, and then dried at temperatures preferably below 100° C. After the usual hydration the base exchange body is treated with a 2–5% solution of cerium nitrate containing 6 mols of water in order to introduce a maximum amount by base exchange.

Phthalic anhydride vapors mixed with hydrogen are passed over the contact mass at 380–420° C., the main product being benzaldehyde containing some benzoic acid. A similar reaction takes place when succinic anhydride admixed with hydrogen is passed over the contact mass, the main resulting product being propionaldehyde. Maleic anhydride may be used instead of succinic anhydride, and produces the same product as the double bond in the maleic anhydride is hydrogenated during the catalysis. At lower temperatures adipic acid, succinic acid or glutaric acid yield the corresponding monocarboxylic acids instead of the aldehydes.

The beryllate solution may be replaced partly or wholly by other metallates, such as for example zincates, plumbites, aluminates, vanadites, chromites, cadmiates. The ferric chloride solution may also be replaced partly or wholly by one or more of the salts of copper, chromium, manganese, zinc or zirconium. The relative proportions of the three classes of components entering into the formation of the base exchange body may be varied within wide limits without affecting the efficiency of the contact mass produced.

Instead of using multi-component zeolites two-component zeolites may be used, for example the reaction products of waterglass and sodium beryllate, sodium plumbite, sodium zincate, or the like. In order to obtain good yields the excess alkalinity to phenolphthalein may be neutralized by means of dilute acids, preferably inorganic acids. The reaction products of soluble silicates with metal salts such as the salts of nickel, copper, cerium, titanium, chromium, thorium, lead, zinc, zirconium and tin may also be used. In the latter case, where two-component zeolites are prepared by the reaction of waterglass with a metal salt, the amount of the latter should be so chosen that when all of it has been added the reaction product is strongly alkaline to litmus and is preferably neutral or slightly alkaline to phenolphthalein.

Other modified contact masses may be obtained by using complex compounds of copper or nickel, such as the ammonium complexes, as components for the base exchange bodies. All of the contact masses may be further modified by trickling salt solutions over them, especially solutions of salts of the heavy metals, in order to exchange more or less of the exchangeable alkali. Part or all of the exchangeable alkali may also be leached out by the use of 1 to 2% inorganic acids, such as nitric acid, or 3 to 5% organic acids such as acetic acid.

A further class of contact masses may be obtained by causing them to react with soluble salts of the metal acids of the 5th and 6th groups of the periodic system, producing the so-called salt like bodies.

In order to produce contact masses economically it is frequently desirable to use the base exchange body as a binder or adhesive for diluents, which latter can, be embedded in the base exchange body in situ. For example kieselguhr, colloidal silica, pumice meal, activated carbon, glaucosil, (the acid leached residue of greensand), may be impregnated with catalytically active components by precipitating the desired oxides in the diluents from corresponding salt solutions. In this manner copper oxide, zinc oxide, titanium oxide, cobalt oxide, ferric oxide, silver oxide, aluminum oxide, cerium oxide and the like may be precipitated, singly or in admixture. Ores containing the main desired catalytic components may also be used as diluents. Depending on the components chosen for the base exchange bodies they may be activators or stabilizer promoters, and in this manner accurately toned contact masses for the different reactions can be readily obtained.

*Example 5*

The base exchange body produced by fusing a mixture of 5 mols $Na_2CO_3$, 1 mol $Al_2O_3$, 3 mols $TiO_2$, and 1 mol borax is carefully leached with warm water and then treated with a normal thorium nitrate solution in order to introduce a maximum of thorium oxide by base exchange. After drying the body is leached with dilute nitric acid in order to remove a maximum of the remaining alkali. This base exchange body may be used as is or it may be powdered or coated onto carrier fragments by means of adhesives. Such fragments may be quartz filter stones, activated carbon, or fragments of thorium oxide.

The contact mass can be readily used for the dehydration of alcohols to unsaturated hydrocarbons. Thus, ethyl alcohol vapors when passed over the contact mass at 340–380° C. are transformed into ethylene with good yields.

The same contact mass may also be used for reactions in which ammonia is split off. Thus, for example, aniline vapors passed over the contact mass are transformed into diphenylamine.

In the examples the vapor phase reactions have been described as carried out at atmospheric pressure. For many reactions this procedure is satisfactory, and of course presents important advantages in simplicity of apparatus and ease of maintenance; certain reactions, however, such as for example decarboxylations in the presence of a reducing gas, are effectively carried out at pressures above that of the atmosphere, and it should be understood that the present invention is equally applicable to processes which are carried out at elevated temperatures. Pressures below that of the atmosphere may of course also be used wherever desirable.

For some of the reactions, and particularly for decarboxylations in the presence of reducing gases where fargoing reduction or hydrogenation is to be avoided, it is advantageous to construct the apparatus of metals which are relatively mild reduction catalysts such as for example copper, aluminum, zinc, etc., or to coat the apparatus with suitable coatings of the above metals. In some cases silver coatings are also desirable.

In the claims the term "permutogenetic" covers base exchange bodies, silicious or nonsilicious, the products obtained by the acid leaching of these base exchange bodies and the salt-like bodies obtained by the action of these base exchange bodies with compounds the acid radicals of which are capable of reacting with the base exchange bodies to produce products which show most of the properties of salts. When so used in the claims, the term "permutogenetic" will have no other meaning.

What is claimed as new is:

1. A method of catalytically splitting groups containing at least one of the elements hydrogen and oxygen from organic compounds containing such groups, which comprises subjecting the compounds at reaction temperatures to the action of a contact mass containing a splitting catalyst and having associated therewith substantial amounts of a permutogenetic body.

2. A method of catalytically splitting groups containing at least one of the elements hydrogen and oxygen from organic compounds containing such groups, which comprises vaporizing the compounds and passing the vapors at reaction temperatures over a contact mass containing a splitting catalyst and having associated therewith substantial amounts of a permutogenetic body.

3. A method of catalytically splitting groups containing at least one of the elements hydrogen and oxygen from organic compounds containing such groups, which comprises vaporizing the compounds and passing the vapors at reaction temperatures over a contact mass containing a splitting catalyst and having associated therewith substantial amounts of a diluted permutogenetic body.

4. A method of catalytically splitting groups containing at least one of the elements hydrogen and oxygen from organic compounds containing such groups, which comprises vaporizing the compounds and passing the vapors at reaction temperatures over a contact mass containing a splitting catalyst and having associated therewith substantial amounts of a permutogenetic body, at least one of the catalytically effective components of the contact mass being chemically combined in or with the permutogenetic body.

5. A method of catalytically splitting groups containing at least one of the elements hydrogen and oxygen from organic compounds containing such groups, which comprises vaporizing the compounds and passing the vapors at reaction temperatures over a contact mass containing a splitting catalyst and having associated therewith substantial amounts of a permutogenetic body, at least one of the catalytically effective components of the contact mass being chemically combined in or with the permutogenetic body in non-exchangeable form.

6. A method of catalytically splitting groups containing at least one of the elements hydrogen and oxygen from organic compounds containing such groups, which comprises vaporizing the compounds and passing the vapors at reaction temperatures over a contact mass containing a splitting catalyst and having associated therewith substantial amounts of a permutogenetic body, at least one catalytically effective component of the contact mass being present in the form of a diluent in the permutogenetic body.

7. A method according to claim 2, in which the permutogenetic body does not contain chemically combined silicon.

8. A method of producing monocarboxylic acid substances, which comprises subjecting an organic polycarboxylic acid compound, at reaction temperatures, to the action of a contact mass containing a splitting catalyst and having associated therewith substantial amounts of a permutogentic body.

9. A method of producing monocarboxylic acid substances, which comprises vaporizing an organic polycarboxylic acid compound and subjecting the vapors at reaction temperatures to the action of a contact mass containing a splitting catalyst and having associated therewith substantial amounts of a permutogenetic body.

10. A method of decarboxylating organic carboxylic acid compounds, which comprises subjecting such compounds in the presence of a reducing gas to the action of a contact mass containing a decarboxylating catalyst and having associated therewith substantial amounts of a permutogenetic body.

11. A method of decarboxylating organic carboxylic acid compounds, which comprises subjecting such compounds in the presence of a reducing gas to the action of a contact mass containing a decarboxylating catalyst and having associated therewith substantial amounts of a permutogenetic body, and also containing at least one compound of an alkali forming metal.

12. A method of decarboxylating organic carboxylic acid compounds, which comprises subjecting such compounds in the presence of a reducing gas to the action of a contact mass containing a decarboxylating catalyst and having associated therewith substantial amounts of a permutogenetic body, and also containing substantial amounts of at least one catalyst selected from the group consisting of oxidation catalysts and reduction catalysts.

13. A method of decarboxylation with reduction, which comprises subjecting an organic polycarboxylic acid compound at reaction temperature, in the presence of a reducing gas to the action of a contact mass containing a permutogenetic body in substantial amounts, the contact mass containing decarboxylating components with reduction components.

14. A method of catalytically splitting organic compounds, which comprises subjecting the compounds at reaction temperature, to the action of a contact mass containing a permutogenetic body in substantial amounts and also containing at least one compound of an element included in the group alkali metals, alkaline earth metals.

15. A method of decarboxylating phthalic anhydride, which comprises subjecting phthalic anhydride in the vapor phase at reaction temperature to the action of a contact mass containing at least one decarboxylation catalyst and having associated therewith a permutogenetic body.

16. A method according to claim 15, in which the reaction takes place in the presence of a reducing gas.

17. A method of decarboxylating phthalic anhydride with reduction, which comprises vaporizing the phthalic anhydride and subjecting it at reaction temperature in the presence of a reducing gas to the action of a contact mass containing a permutogenetic body, said contact mass containing decarboxylating components and reduction components.

18. A method according to claim 15, in which the reaction takes place in the presence of hydrogen.

19. A method according to claim 17, in which the reaction takes place in the presence of hydrogen.

Signed at Pittsburgh, Pennsylvania, this 7th day of March, 1928.

ALPHONS O. JAEGER.